Patented Oct. 7, 1941

2,258,256

UNITED STATES PATENT OFFICE 2,258,256

ELECTRICAL INSULATING MATERIAL

Wallace Bentley MacKenzie, New York, N. Y., assignor to Phelps Dodge Copper Products Corporation, New York, N. Y., a corporation of Delaware No Drawing. Application January 13, 1938, Serial No. 184,767

3 Claims. (Cl. 260—4)

The present invention relates to rubber-like material and has for its object the production of elastic non-thermoplastic objects made from non-thermoplastic non-heat-convertible organic material by a process of plasticization and thermo-setting.

Many processes are well known in the art, and they follow two general methods: (1) Mixing the original material with a suitable plasticizer whereby it can be formed, molded, or extruded as the desired object and, (2) mixing the material with a suitable thermo-setting material whereby the object, after formation, molding, or extrusion, may be thermo-set into a non-plastic, non-heat-convertible state.

By heat-convertible is here meant susceptibility to change in chemical composition by exposure to temperatures below 250° F.

My invention consists in using a single material both as plasticizer and thermo-setting material. This has the advantage of eliminating the effect that ordinary plasticizers and thermo-setters usually work against one another in attaining some desired property of the final object of manufacture.

As an example of this process I select a non-thermoplastic non-heat-convertible hydrocarbon of molecular weight over 5000 such as Vistanex, with the object of making insulation for electric conductors. A suitable thermo-setter and plasticizer for this purpose would be commercial rubber hydrocarbon but this is too viscous to act as a plasticizer. I, therefore, reduce the viscosity of the rubber by chemically controlled oxidation, i. e., oxidation by a small proportion of oxygen activated by a catalyst. Organic catalysts, such as mercapto-benzothiazole, have been found suitable but there are many materials, known to organic chemists, which may be substituted therefor.

My process, in the case of Vistanex, consists in milling the rubber with the catalyst until a degree of plasticity is obtained, permitting the milled mixture to be extruded with the equipment customarily used on rubber compounds commonly made. The rubber thus processed is then milled with Vistanex until homogeneity is attained. Mineral activators, such as zinc oxide and whiting, are then added, followed by anti-oxidants and accelerators such as are used in rubber compounding. Finally the curing agents, such as sulphur, selenium and/or tellurium, are added.

The mixture may be formed by any process known to the art. In the case of insulated wire, the mixture may be applied to the wire by extrusion or the strip method. In any case, the formed object is thermo-set by heat and pressure as in ordinary vulcanization.

By the above process, I am able to make a Vistanex insulation containing over 40% Vistanex by weight, having a very desirable and hitherto unattainable combination of electrical, mechanical and chemical properties.

A specific case is that of a wire insulated with compound prepared as described above and containing, by weight, 50% Vistanex, 41% plasticized rubber, 2% zinc oxide, 1% whiting, 2% stearic acid, ¾% sulphur, the remainder being the usual pigments, organic accelerators and anti-oxidants known to those conversant with the art.

The properties are as follows:

| | |
|---|---|
| Tensil strength, lbs./sq. in. | 730 |
| Elongation at break from 2" to | 11.6" |
| Set, after elongation from 2" to 6" | $\frac{1}{8}$" |
| S. I. C., 60 cycles, 70° C. | 2.7 |
| Power factor, 60 cycles, 70° C., per cent | 0.4 |
| Power factor, 1000 cycles, 70° C., per cent | 0.4 |
| Dielectric strength, volts/mils | 475. |
| Acetone extract, percent | 4.0 |
| Appearance of acetone extract | Straw color |
| Chloroform extract, over | 40.0 |
| Appearance of chloroform extract | Colorless |
| Flexibility at low temperatures | Very good |
| Specific gravity (important for portability) | 0.97 |
| Ability to resist sun-checking | Very good |
| Megohm constant per mile | 10,000. |

This combination of properties makes this insulation particularly desirable for high voltage power cables and for communication cables.

As far as I know the only available organic materials which are non-thermoplastic and non-heat-convertible, are hydrocarbons which are soluble in chlorinated solvents, such as chloroform. I can, therefore, use the physical properties of the chloroform extract as an indicator of the characteristics of the non-thermoplastic hydrocarbons used.

The particular physical property of the chloroform extract most useful as an indicator of Vistanex content is the "Viscosity Index". This is a number expressing the effect of temperature on viscosity and as such may be used as an index of thermoplasticity. A value of over 200 would indicate a substantially nonthermoplastic product.

Non-thermoplastic, as used in this application, is defined as possessing a "viscosity index" greater than 200, this being a number used by the petroleum industry to represent effect of temperature on viscosity. Where I have used the term non-heat-convertible, I mean it to be that property unchanged by exposure to temperatures up to 250° F. even in presence of accelerators of such changes which are in common use with rubber, neoprene, etc.

Thermo-setting as used throughout the specification and claims means the loss of thermoplasticity and acquirement of elasticity which is less susceptible to temperature than that of the nonheat converted compound.

Vistanex is a hydrocarbon formed by action of catalytic condensing agents from isobutylene and having a molecular weight ranging from 15,000 to 200,000 depending on the conditions under which the catalyst is employed and is chemically designated as poly-isobutylene.

While I have emphasized the value of this material for electrical insulation, its physical properties make it desirable for other purposes, such as door-stops on automobiles, and it is the intent of this patent application to cover the material for such diverse uses.

I wish it distinctly understood that my rubber-like material described herein is in the manner of form in which I desire to use it and that changes or variations may be made as may be convenient or desirable without departing from the salient features of my invention and I therefore intend the following claims to cover such modifications as naturally fall within the lines of invention.

I claim:

1. An insulating material for an electrical cable having high heat resistance and unusually high resistance to water absorption comprising a vulcanized rubber insulating compound which is the product of vulcanizing a mixture consisting essentially by weight 50 parts of isobutylene polymer, 41 parts of rubber plasticized by oxidation, said oxidization being catalyzed by mercapto-benzothiazole, 2 parts zinc oxide, one part whiting, 2 parts stearic acid, less than one part sulphur, milled and formed prior to being heat converted.

2. An insulating material for an electrical cable having high heat resistance and unusually high resistance to water absorption comprising a vulcanized rubber insulating compound which is the product of vulcanizing a mixture consisting essentially by weight of 45 to 55 parts of isobutylene polymer, 35 to 50 parts rubber plasticized by oxidization, said oxidization being catalyzed by mercapto benzothiazole as a chemical catalyst, 1 to 3 parts of zinc oxide, substantially one part of whiting, one to 3 parts of stearic acid, the balance sulphur under one part, milled and formed prior to being heat converted.

3. An elastic insulating material made from polyisobutylene and a rubber, catalytically oxidized by mercapto-benzothiazole and a small percentage of oxygen capable of acting as a plasticizer for it, said mix when thermoset characterized by a S. I. C. under 3, a power factor under 1%, a tensil strength greater than 600# per sq. in., and a chloroform extract that has a viscosity index greater than 200 and is therefore substantially non-thermoplastic.

WALLACE BENTLEY MacKENZIE.